United States Patent
Krueger et al.

[11] Patent Number: 5,994,860
[45] Date of Patent: Nov. 30, 1999

[54] SERIES WOUND MOTOR WITH ELECTRICAL BRAKE

[75] Inventors: Andreas Krueger, Hamburg; Klemens Krahn, Norderstedt, both of Germany

[73] Assignee: Dolmar GmbH, Hamburg, Germany

[21] Appl. No.: 09/077,735

[22] PCT Filed: Dec. 2, 1996

[86] PCT No.: PCT/EP96/05319

§ 371 Date: Jun. 10, 1998

§ 102(e) Date: Jun. 10, 1998

[87] PCT Pub. No.: WO97/22175

PCT Pub. Date: Jun. 19, 1997

[30] Foreign Application Priority Data

Dec. 13, 1995 [EP] European Pat. Off. ............ 195 46 546

[51] Int. Cl.⁶ ...................................................... H02P 1/00
[52] U.S. Cl. .......................... 318/527; 318/244; 318/245; 318/246; 318/375
[58] Field of Search ...................... 310/210, 93; 318/376, 318/527, 244, 245, 246, 375

[56] References Cited

U.S. PATENT DOCUMENTS

| | | | |
|---|---|---|---|
| 3,596,161 | 7/1971 | Swanke et al. | 318/305 |
| 3,673,481 | 6/1972 | Hardin | 318/246 |
| 3,678,357 | 7/1972 | Swanke et al. | 318/245 |
| 4,250,436 | 2/1981 | Weissman | 318/245 |
| 4,751,414 | 6/1988 | Davis et al. | 310/93 |
| 5,063,319 | 11/1991 | Mason et al. | 310/210 |
| 5,294,874 | 3/1994 | Hessenberger et al. | |
| 5,648,706 | 7/1997 | Polk et al. | 318/376 |

FOREIGN PATENT DOCUMENTS

| | | | |
|---|---|---|---|
| 0398609A1 | 11/1990 | European Pat. Off. | H02P 3/06 |
| 3530685A1 | 3/1987 | Germany | B27B 17/00 |

*Primary Examiner*—Robert E. Nappi
*Assistant Examiner*—Rita Leykin
*Attorney, Agent, or Firm*—McCormick, Paulding & Huber

[57] ABSTRACT

In a series-wound motor with electric brake, which comprises an armature provided with an armature winding and at least two exciter coils mounted on pole shoes as well as switchgear which, in the operative phase of the motor, serially connect the exciter coils with the armature winding and connect the serial connection to terminal clamps for the operating voltage and which, in the braking phase, interrupt the connection to the terminal clamps and short-circuit the armature winding by the parallel connection of a winding, an independent optimization of the braking behavior is made possible in that at least one of the exciter coils is subdivided into two part windings and in that, when braking, one of the part windings has its polarity changed and is short-circuited with the armature winding.

3 Claims, 2 Drawing Sheets

SERIES WOUND MOTOR WITH ELECTRICAL BRAKE

SCOPE OF APPLICATION

The present invention relates to the field of electromotors. It regards a series-wound motor with electric brake, comprising an armature provided with an armature winding and at least two exciter coils disposed on pole shoes as well as switchgear means which, in the operating phase of the motor, connect the exciter coils in series with the armature winding and connect the series connection with terminal clamps for the operating voltage and which, in the braking phase, interrupt and short-circuit the armature winding by the parallel connection of a winding.

STATE OF THE ART

A series-wound motor is known e.g. from the DE-A1-35 31 685 (or U.S. Pat. No. 4,630,862) or from the DE-C2-30 35 185.

In motor-driven electric power tools such as per example chain saws, hedge clippers or lawn mowers, it is desirable on account of safety requirements, to brake the motor after the switching-off as speedily and safely as possible so as to limit risks of injury by the over-travel or after-running of the power tool or to avoid such risks altogether. Such a braking or deceleration can be effected either mechanically or else electrically. In this case the electric braking possesses the advantage that it involves virtually no wear, calls for only a minor additional expenditure and can be integrated in a space-saving fashion into the driving system.

The electric braking can be realized in a particularly simple fashion if the electric power tool is driven by a series-wound motor, in which the field winding and the armature winding, in the course of normal operation, is serially connected to the supply voltage. In the DE-c2-30 35 185 mentioned in the beginning, a resistance braking has been proposed for the braking of such a series-wound motor, in which the voltage supply is interrupted and the armature or the armature winding is short-circuited via the field winding connected in the inverse direction and a serially disposed NTC resistor. What is problematic in this solution is that an additional NTC resistor is required and that the NTC resistor has to be highly accurately dimensioned in order to make an effective, wear-resistant braking possible. If, on the other hand, the NTC resistor is bridged across, extremely high electric currents arise at the beginning of the braking operation, which cause a flashing over on the collector.

In the DE-A1-35 30 685, according to FIG. 1, it is proposed for the electric braking as a series-wound motor 10, in a field winding comprised of two exciter coils 13, 14, for the braking operation, to interrupt the connection to the terminal clamps 16 and to merely change the polarity of one exciter coil 14 of the field winding and to connect the armature winding 17 in parallel. The motor or the electric contacts in the motor and in the switch are, according to the publication, hardly subjected to a load in the process since, in the short-circuiting with only one exciter coil, relatively low short circuits do occur. However, it is disadvantageous in this solution that it is not possible to adjust to optimize the driving and braking behavior independently from one another. When the exciter coils are modified in order to change the driving behavior in the number of windings or in the geometry or the like, this modification also has an unintentional effect on the braking behavior because the same coil is used for both driving and braking. An independent adjustment would at most be conceivable if the coil employed for the braking would, in the form of a separate coil, be accommodated in the stator in addition to the exciter coil. However, in order to do this, the bundle of laminations in an existing motor would have to be modified, which calls for a considerable additional expenditure.

TECHNICAL PROBLEM, SOLUTION, ADVANTAGES

That is why it is the technical problem of the invention to provide a series-wound motor with electric braking which, with regard to the electric braking, can be flexibly adapted at low cost to the various cases of application.

In this case provision is made in a motor of the type stated in the beginning that at least one of the exciter coils is subdivided into two part windings and in that, when braking, the polarity of one of the part windings is changed and short-circuited with the armature winding. By the subdivision of the exciter coil into two part windings which, in the driving operation, are serially connected, the effect of the exciter coil on the driving remains unchanged, independently of how the exciter coil is divided between the two part windings. By means of a suitable selection of the division between the part windings it will then be possible to optimize the part winding provided for the braking in the braking case without the driving behavior being influenced by this optimization.

It is particularly advantageous if, according to a preferred embodiment of the invention, both exciter coils are subdivided into part windings and if, in the braking phase, the polarity of one of the part windings is changed and short-circuited with the armature winding. By the subdivision of the exciter coil into two part windings, which, in the driving phase, are serially connected, the effect of the exciter coil on the driving behavior remains unchanged irrespective of how the exciter coil is divided between the two part windings. By means of a suitable selection of the division between the part windings it will then be possible to optimize the part winding provided for the braking for the braking case without the driving behavior being influenced by this optimization.

It is particularly advantageous if, according to a preferred embodiment of the invention, both exciter coils are subdivided into part windings and if, when braking, the serial connection of one part winding each per exciter coil is changed in its polarity and is connected in parallel to the armature winding. Hereby the loads generated in the braking operation are more uniformly distributed on the windings and the motor.

The series-wound motor according to the invention is particularly well suited as driving motor for driving a motor-operated chain saw because it is possible thereby, additionally to a speedily acting mechanical emergency brake, to realize a safety braking in a normal switching off of the saw.

BRIEF DESCRIPTION OF THE DRAWINGS

In the following, the invention will be described in greater detail with the aid of embodiment examples in connection with the drawings. Thus

DETAILED DESCRIPTION OF THE INVENTION AND BEST WAY OF REALIZING THE INVENTION

Figure 1A:
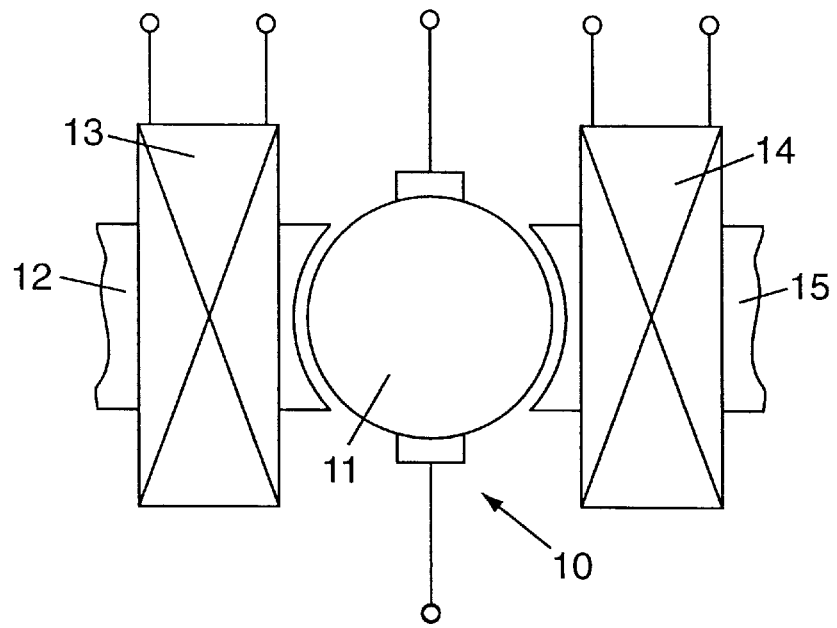
FIGS. 1a and 1b show the schematic construction of an electrically braked series-wound motor according to the state of the art.
Figure 1B:
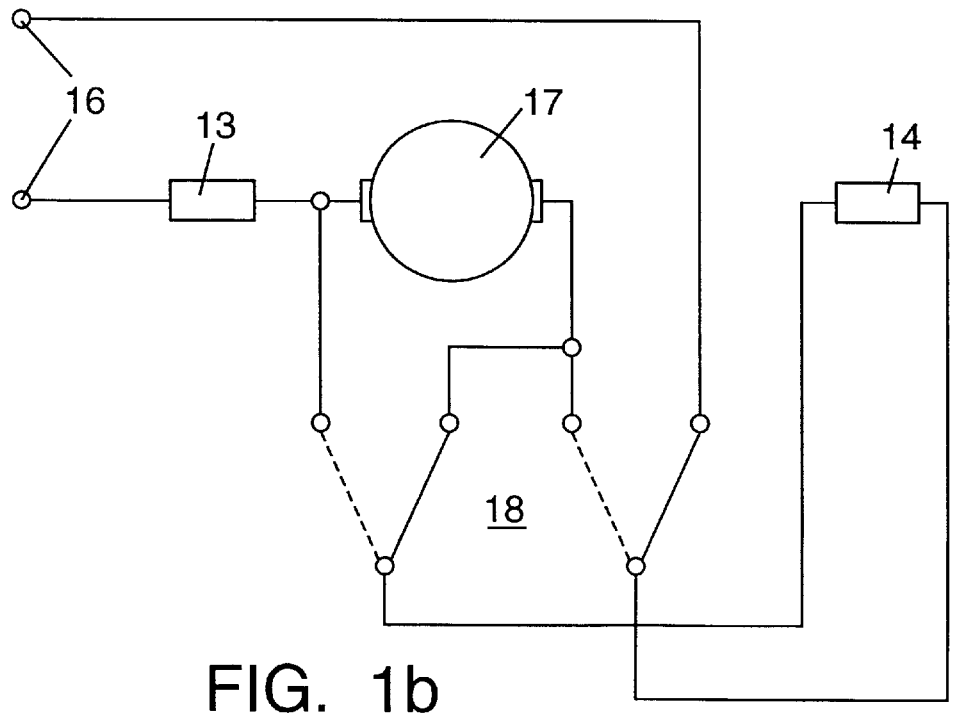

As already mentioned in the beginning, a known solution according to FIG. 1 departs from a series-wound motor 10 (FIG. 1a), which comprises an armature 11 and two exciter coils 13 or 14 mounted in each case on a pole shoe 12 or 15. Together, the exciter coils 13, 14 form the field winding, while the armature 11 carries pertinent armature windings which can be selected by means of a commutator from outside. The various windings as per FIG. 1b are electrically interconnected. By means of a switch 18, which is capable of assuming two positions (driving case: switch position depicted in continuously drawn lines; braking case: switch position depicted in broken lines), the two exciter coils 13 and 14 are, in the driving case, serially connected to the armature winding 17 and connected to terminal clamps 16 for the supply voltage. In the braking case, by throwing the switch 18 over, the connection to a terminal clamp is interrupted and, at the same time, the polarity of one exciter coil 14 is reversed and connected in parallel to the armature winding 17. By the electromagnetic interaction between the rotating armature winding and the parallel-connected exciter coil 14 the motor is braked. Clearly discernible here is the disadvantage described in the beginning, i.e. that the same exciter coil 14 is employed and must be employed unchanged both for the driving as well as for the braking.

Figure 2A:
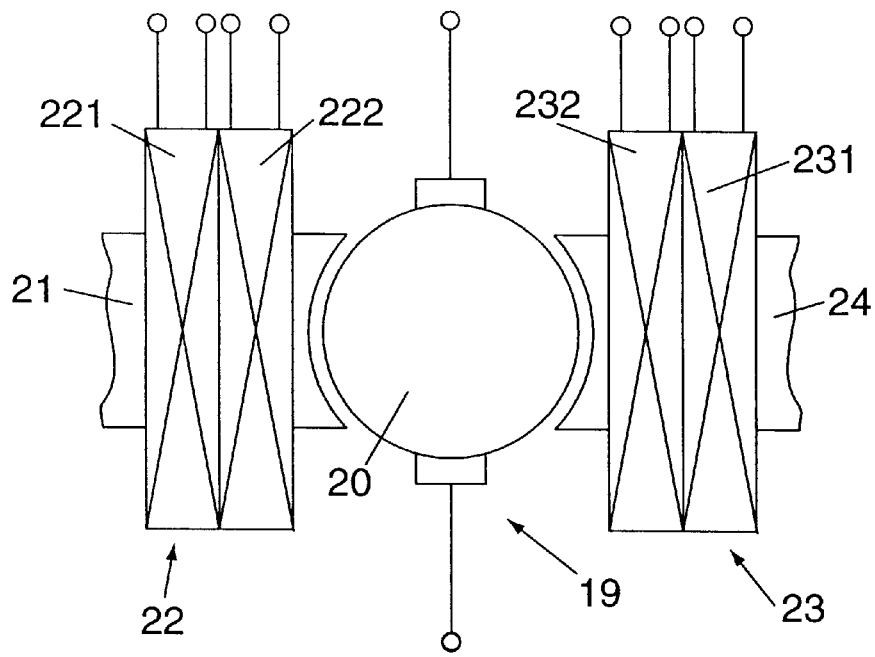
FIGS. 2a and 2b show the comparable construction of a preferred embodiment example of the series-wound motor according to the invention.

On the other hand, in the embodiment example illustrated in the FIG. 2 of the motor according to the invention, a different procedure is made use of. According to FIG. 2a, the series-mounted motor 19 comprises here an armature 20 and two exciter coils 22 and 23 mounted on pole shoes 21, 24 which, together, form the field winding. However, un-like in FIG. 1, the two exciter coils 22 and 23 each are subdivided into two serially arranged part windings 221 and 222 or 231 and 232. With this the possibility exists of employing per exciter coil only one of the part windings for braking purposes, in which case it is possible, on account of different part conditions of the part windings 221, 222 or 231 and 232, to adjust and optimize the braking behavior within wide limits.

Figure 2B:
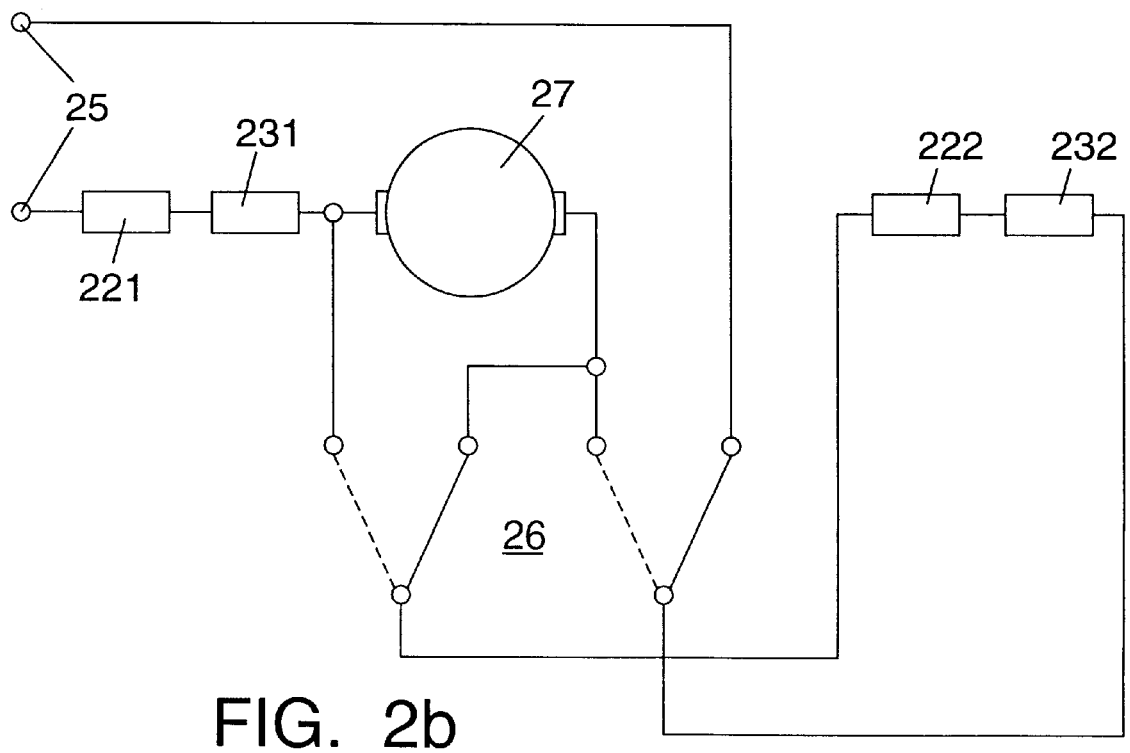

The changing over between driving and braking case is, as per FIG. 2b, effected by means of a switch 26 which, in the driving case (switch position depicted in continuous lines), connects all part windings 221, 222 and 231, 232 in series with the armature winding and with the terminal clamps 25 for the supply voltage. In the braking case (switch position depicted in broken lines), the connection to a terminal clamp 25 is interrupted and the serial connection of two part windings 222 and 232 (one part winding each from one exciter coil) has its polarity changed and is short-circuited by means of the armature winding 27. In this connection it goes without saying that also other combinations of part windings such as e.g. the part windings 221 and 222 or the part windings 222 and 231 can be called upon for the braking. But it is also conceivable to connect in parallel only one of the part windings, viz. 222 or 232, or another one for braking the armature winding 27. Finally it is possible, if further exciter coils exist, to also subdivide these additional exciter coils into part windings and to employ certain part windings for braking purposes.

By the solution according to the invention a free dimensionability of the braking coils or braking windings used for the electric braking results without influencing the size of the entire field winding or of the exciter coils and thus on the motor layout. It is hereby possible to adapt the braking behavior to the motor without having to effect modifications to the bundle of laminations in this connection, that is to say that each existing motor layout can be adjusted later for the electric braking operation by a modification of the winding process.

The employment of such a motor is especially advantageous in an electrically operated chain saw because here, in the normal switching off case, a dangerous after-running of the saw can be reliably avoided at low cost. By the combination with a mechanically acting emergency brake, which is triggered by the recoil or the slipping of the saw and which, by way of example, is described in the DE-A1-31 50 769, a chain saw results which possesses a high degree of safety in the various operational situations.

LIST OF REFERENCE NUMBERS

| | |
|---|---|
| 10, 19 | series-wound motor |
| 11, 20 | armature |
| 12, 15 | pole shoe |
| 13, 14 | exciter coil |
| 16, 25 | terminal clamp |
| 17, 27 | armature winding |
| 18, 26 | switch |
| 21, 24 | pole shoe |
| 22, 23 | exciter coil |
| 221, 222 | part winding |
| 231, 232 | part winding. |

We claim:
1. Series-wound motor with electric brake, comprising:
an armature provided with an armature winding;
at least two exciter coils mounted on pole shoes such that at least one of the pole shoes is subdivided into two part windings;
switchgear means for, in the operative phase of the motor, serially connecting the exciter coils including the two part windings with the armature winding and connecting the serial connection to terminal clamps for the operating voltage and for, in the braking phase, interrupting the connection to the terminal clamps and changing the polarity of one of the part windings and short-circuiting the armature winding.
2. Series-wound motor according to claim 1, characterized in that both exciter coils are subdivided into part windings and in that, when braking, the serial connection of one part winding each per exciter coil has its polarity changed and is short-circuited to the armature winding.
3. Employment of a series-wound motor according to claim 1 for driving a motor-powered chain saw.

* * * * *